United States Patent Office 3,071,489
Patented Jan. 1, 1963

3,071,489
PROCESS OF FLAME SPRAYING A TUNGSTEN CARBIDE-CHROMIUM CARBIDE-NICKEL COATING, AND ARTICLE PRODUCED THEREBY
John F. Pelton and John M. Koffskey, Jr., Indianapolis, Ind., assignors to Union Carbide Corporation, a corporation of New York
No Drawing. Filed May 28, 1958, Ser. No. 738,300
2 Claims. (Cl. 117—22)

This invention relates to a specific coating composition, to a method for applying same, and to the coated product so obtained. More particularly, it relates to such coating compositions capable of being applied by a high temperature, high velocity process.

According to the invention a coating composition comprising 70 weight percent of tungsten carbide, 24 weight percent of chromium carbide, and 6 weight percent of nickel is applied by a high temperature, high velocity coating process which deposits the material on a body to be coated. The coating thus formed has a positive metallurgical bond with the base material forming a dense lamellar film.

As industry has progressed, there has been an increasing demand for materials that can withstand high temperature erosion conditions. One such material is tungsten carbide. It has been successfully applied as a protective, wear-resistant coating to various base metals by means of the detonation plating process disclosed in United States Patent No. 2,714,563.

These prior tungsten carbide coatings which usually contain cobalt as a binder are able to withstand oxidizing conditions and maintain satisfactory wear resistance up to about 1000° F. Above this temperature the oxidation of the coating becomes severe resulting in excessive wear. In addition, these prior tungsten carbide coatings are unable to satisfactorily stand up under mild alkaline conditions such as found in tap water, de-ionized water, or typical grinding fluids. Polished surfaces of these prior coatings are easily stained by fingerprints due to handling and by atmospheric discoloration.

It is, accordingly, an object of this invention to provide a coating composition suitable for high temperature high velocity coating processes.

It is a further object to provide such a composition which will result in a coating having good resistance to attack by mild alkaline solution and will further retain luster in the face of continuous handling and atmospheric attack.

It is still a further object to provide a coating composition having improved oxidation resistance above about 1000° F.

The disadvantages of prior water-resistant coatings are overcome by the use of a novel composition of matter comprising about 70 weight percent tungsten carbide (WC and lower carbides)–24 weight percent chromium carbide ($Cr_3C_2$ and lower carbides)–6 weight percent nickel. This material can be applied as a coating to various base materials by means of the detonation plating process disclosed in United States Patent No. 2,714,563 or by other high temperature, high velocity coating processes. The actual composition of the applied coating will be somewhat different from the above starting composition due to changes brought about in the high temperature, high velocity coating process. The main constituent of the coating is the mixed carbide, $(W_xCr_y)C_z$. The coating also contains about 25 weight percent tungsten carbide (WC) and about 4 weight percent nickel. The remainder includes lower carbides of tungsten and chromium.

The resultant coating has a lamellar structure composed of irregularly shaped microscopic leaves interlocking and overlapping with each other. This structure is characteristic of the coatings obtained by means of the high velocity, high temperature coating processes necessary to obtain an adherent bond of this refractory coating to a base metal.

The advantages of the coating obtained from this new composition to resist corrosion are indicated in Table I. The data were obtained by 24 hours' static exposure to the corrosive medium.

Table I

| Corrosive Medium | Severity of Attack | |
|---|---|---|
| | $WC-Cr_3C_2-$ Ni Coating | Prior WC-Co Coating |
| Tap water | None | Slight. |
| De-ionized water | do | Moderate. |
| 10% Cincinnati Grinding Fluid | do | Do. |
| 3% sodium chloride | Slight | Do. |
| 10% sodium chloride | do | Do. |
| 30% sodium hydroxide | do | Do. |

The resultant coating will also resist staining by fingerprints due to handling and is not susceptible to atmospheric discoloration. These properties in combination with its superior surface finish make this composition quite useful for coating gage blocks and plug gages.

The oxidation resistance of the novel tungsten carbide-chromium carbide-nickel coating thus obtained was compared with that of a prior art tungsten carbide-cobalt coating. The samples were exposed under static conditions to air at temperatures of 1000° F. and above for 22 hours. At 1000° F. the two coatings stood up equally well. At 1200° F. and 1400° F. the prior art coating was rapidly oxidized while the new coating was only slightly affected.

Under dynamic wear-resistance tests involving combined conditions of alkaline corrosion and wet abrasion, the tungsten carbide-chromium carbide-nickel coating was superior to prior tungsten carbide-cobalt coating by a factor of 30. This new coating composition was also serviceable under dynamic wear conditions up to a temperature of about 1400° F. Under wet abrasion wear alone, this new coating was equally effective in withstanding erosion when compared with acceptable prior tungsten carbide coatings. This new composition thus has the desirable properties of being abrasion resistant and more corrosion resistant and oxidation resistant than prior WC coatings.

The novel composition can be prepared in several ways. One method is to mix powders of tungsten metal, chromium-nickel alloy, and carbon and then sinter and carburize the mixture in a reducing atmosphere at 1400° C. This method starts originally with a mixture of 65.5 weight percent tungsten, 28.5 weight percent chromium-nickel alloy (80 percent chromium–20 percent nickel), and 6 weight percent carbon. Chromium and nickel powder mixtures could be substituted for the chromium nickel alloy. The resulting sintered mass is then crushed and screened to prepare desired size powders suitable for coating (about 325 mesh and finer). Another method is to blend the desired composition directly from tungsten carbide, chromium carbide, and nickel powders. The particular method of powder preparation used could depend upon economic factors such as availability of particular raw materials and processing costs.

The following example describes the application of this novel coating composition to a baseplate by means of the detonation plating process.

Acetylene at 1.55 c.f.m., oxygen at 1.55 c.f.m., and nitrogen at 1.67 c.f.m were introduced to a detonation gun to form a detonatable mixture having an oxygen/ carbon atomic ratio of 10. Finely divided coating powder having a composition of about 70 weight percent tungsten carbide, 24 weight percent chromium carbide, and 6 weight percent nickel suspended in a nitrogen carrier gas stream of 0.4 c.f.m. was introduced at a rate of 60 grams/min. to the barrel of the detonation gun. This detonatable mixture surrounding the coating particles contained 40 volume percent nitrogen. The detonation mixture was ignited at a rate of about four times per second and the coating powder was impinged on a steel baseplate to form a dense, adherent coating compound of irregularly shaped microscopic leaves interlocking and overlapping with each other. The coating hardness was about 1100 V.P.N. under a 300 gram load.

When the detonation plating process is used with this coating composition, it is preferred that about 40 volume percent total inert gas be added to the detonation mixture. This permits an oxygen/carbon atomic ratio of 1.0 to be used which results in minimum decarburization of the coating composition during the coating process. When inert gas such as nitrogen is not added, satisfactory coatings cannot be obtained.

It has been found that the particular ratios of tungsten carbide, chromium carbide, and nickel in the coating composition represent an important advance in the art of coatings having high temperature oxidation resistance and corrosion resistance. However, the coating composition may contain between about 60–80 weight percent of tungsten carbide, between about 14–34 weight percent of chromium carbide, and between about 4–8 weight percent of nickel without affecting the utility of the coating as disclosed. However, the ratios set forth in the example are preferred for optimum results.

While the specific application of the instant coating by means of the detonation process has been disclosed, it is to be understood that other high temperature, high velocity coating processes could be used such as the arc torch as disclosed in United States application Serial No. 706,099, filed December 30, 1957, of Gage et al., now abandoned, and the jet burner as disclosed in United States application Serial No. 505,228, filed May 2, 1955, of G. H. Smith et al., now Patent No. 2,861,900.

What is claimed is:

1. A method of applying a high temperature erosion resistant coating on a body to be coated which comprises introducing powder comprising about 70% by weight tungsten carbide, 24% by weight chromium carbide, and 6% by weight nickel into a high velocity, high temperature gas stream and directing such powder laden gas stream against said body to be coated.

2. An article of manufacture made according to the process definid in claim 1 wherein the coating on such body has a lamellar structure of interlocking and overlapping microscopic leaves bonded to each other and to said body.

References Cited in the file of this patent

UNITED STATES PATENTS

| | | |
|---|---|---|
| 1,833,099 | Welch | Nov. 24, 1931 |
| 2,205,864 | Schwartzkopf | June 25, 1940 |
| 2,253,969 | Dawihl | Aug. 26, 1941 |
| 2,581,252 | Goetzel et al. | Jan. 1, 1952 |
| 2,714,563 | Poorman et al. | Aug. 2, 1955 |
| 2,791,025 | Ballhausen et al. | May 7, 1957 |
| 2,861,900 | Smith et al. | Nov. 25, 1958 |
| 2,964,420 | Poorman et al. | Dec. 13, 1960 |
| 2,972,550 | Pelton | Feb. 21, 1961 |

FOREIGN PATENTS

| | | |
|---|---|---|
| 499,927 | Great Britain | Jan. 31, 1939 |
| 318,524 | Switzerland | Feb. 27, 1957 |

OTHER REFERENCES

Kennedy: Materials and Methods, vol. 36, No. 2, August 1952, pp. 166, 168, 170, 172, 174.